(12) United States Patent
Nakamura et al.

(10) Patent No.: US 6,359,738 B1
(45) Date of Patent: Mar. 19, 2002

(54) TWO-GROUP ZOOM LENS SYSTEM AND DISPLAY DEVICE HAVING PHOTOTAKING FUNCTION

(75) Inventors: Tohru Nakamura, Hachioji; Hirofumi Tsuchida, Kunitachi, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/494,653

(22) Filed: Jan. 31, 2000

(30) Foreign Application Priority Data

Nov. 12, 1999 (JP) .......................................... 11-322453

(51) Int. Cl.$^7$ ........................ G02B 15/14; G02B 13/02
(52) U.S. Cl. ...................... 359/691; 359/680; 359/682; 359/745; 359/748
(58) Field of Search ................................ 359/691, 680, 359/682, 745, 748, 793

(56) References Cited

U.S. PATENT DOCUMENTS 4,963,005 A * 10/1990 Tsuji ............................ 359/680
4,993,814 A * 2/1991 Hata ............................ 359/680

* cited by examiner

Primary Examiner—Georgia Epps
Assistant Examiner—Michael A. Lucas
(74) Attorney, Agent, or Firm—Pillsbury Winthrop LLP

(57) ABSTRACT

The invention relates to a zoom lens system of two-group construction, one lens for each group, which is less susceptible to aberration variations even upon zooming and can be much more increased in terms of lens aperture and zoom ratio. The zoom lens system of two-group construction comprises, in order from an object side thereof, a first lens group G1 having negative refracting power and a second lens group G2 having positive refracting power and in which a focal length thereof is varied by moving both the lenses while an optical axis separation therebetween is varied. The first lens group G1 consists of one concave lens having a strong concave surface directed toward an image plane side of the zoom lens system and formed of a homogeneous medium, and the second lens group G2 consists of one convex lens formed of a homogeneous medium. A stop S is located between the first lens group G1 and the second lens group G2. The first lens group G1 moves largely from the object side toward an image side of the zoom lens system while the second lens group G2 moves from the image side toward the object side during zooming from a wide-angle end to a telephoto end of the zoom lens system.

22 Claims, 10 Drawing Sheets

TWO-GROUP ZOOM LENS SYSTEM AND DISPLAY DEVICE HAVING PHOTOTAKING FUNCTION

BACKGROUND OF THE INVENTION

The present invention relates generally to a zoom lens system of two-group construction in which each lens group consists of a single lens alone, and more particularly to a zoom lens system which is suitable for use as an image pickup lens for still cameras, video cameras or the like, and which comprises two groups, each consisting of one lens, and has an F-number of 4 or less at its wide-angle end.

So far, some proposals have been made of a zoom lens system of two-group construction, each group consisting of one single lens. Referring to an optical system disclosed in JP-A 7-333500 for instance, the power of the second lens group is too strong to reduce aberration variations upon zooming, making it very difficult to increase lens aperture and zoom ratio. JP-A's 10-3037 and 11-6960 put forward a zoom lens system of two-group construction using a gradient index medium. In consideration of material availability, etc., however, it is preferable to use a homogeneous medium.

SUMMARY OF THE INVENTION

In view of such problems with the prior art as mentioned above, it is an object of the present invention to provide a zoom lens system of two-group construction, each consisting of one single lens, which is less susceptible to aberration variations even upon zooming and can achieve large lens aperture and high zoom ratio.

According to one aspect of the invention, this object is achievable by the provision of a zoom lens system of two-group construction, which comprises, in order from an object side thereof, a first lens group having negative refracting power and a second lens group having positive refracting power and in which a focal length thereof is varied by moving both said lenses while an optical axis separation therebetween is varied, wherein:

said first lens group consists of one concave lens having a strong concave surface directed toward an image plane side of said zoom lens system and formed of a homogeneous medium, said second lens group consists of one convex lens formed of a homogeneous medium, a stop is located between said first lens group and said second lens group, and said first lens group moves from said object side toward an image side of said zoom lens system while said second lens group moves from said image side toward said object side during zooming from a wide-angle end to a telephoto end of said zoom lens system.

Preferably in this case, the convex lens in the second lens group should have at least one surface defined by an aspherical surface.

Preferably, the zoom lens system of the invention should satisfy the following ratio relation:

$$1.0 < f_2/f_w < 4.0 \tag{1}$$

where $f_w$ is a focal length at which said zoom lens system has the shortest focal length and $f_2$ is a focal length of the second lens group.

Preferably, the stop should move together with the second lens group while the following relation is satisfied:

$$0.5 < \{(n_2-1)/R_{2F}\}/(1/f_2) < 1.5 \tag{4}$$

where $n_2$ is the refractive index of the convex lens in the second lens group, $R_{2F}$ is the radius of curvature of a surface of the convex lens located on the object side, and $f_2$ is the focal length of the second lens group.

According to another aspect of the invention, there is also provided a display device with a built-in two-group zoom lens system having phototaking function, which comprises:

a first lens group consisting of one negative lens and a second lens group consisting of one positive lens, an electronic image pickup element for receiving an object image formed by only refracting powers of said first lens group and said second lens group, and a processing circuit for electrically processing information on said object image received by said electronic image pickup element, and an image display element for displaying the information on said object image fed through said processing circuit to an viewer.

Preferably in this case, the two-group zoom lens system should be constructed in such a way that a separation between the first lens group and the second lens group is varied for zomming from a wide-angle end to a telephoto end of the system.

Alternatively, the separation between the first lens group and the second lens group may be narrowed for zooming from the wide-angle end to the telephoto end of the system.

Preferably, a stop should be located between the first lens group and the second lens group.

A filter may be located between the second lens group and the electronic image pickup element.

A cover member may be located in front of the first lens group.

The first lens group may consist of one cemented lens comprising a plurality of cemented lens elements.

The first lens group may consist of one lens element.

The second lens group may consist of one cemented lens comprising a plurality of cemented lens elements.

The second lens group may consist of one lens element.

The image display element may be built up of a liquid crystal display having a flat screen.

Preferably, the first lens group should have at least one aspherical surface configured to make correction for aberrations.

Preferably, the second lens group should have at least one aspherical surface configured to make correction for aberrations.

In the another aspect of the invention, too, the following ratio relation should preferably be satisfied:

$$1.0 < f_2/f_w < 4.0 \tag{1}$$

where $f_w$ is a focal length at which said zoom lens system has the shortest focal length and $f_2$ is a focal length of the second lens group.

Preferably, the stop should move together with the second lens group while the following relation is satisfied:

$$0.5 < (n_2-1)f_2/R_{2F} < 1.5 \tag{4}$$

where $n_2$ is the refractive index of the convex lens in the second lens group, $R_{2F}$ is the radius of curvature of a surface of the convex lens located on the object side, and $f_2$ is the focal length of the second lens group.

Preferably, the zoom lens system should be compactly housed in the display device by allowing the first lens group and the second lens group to move in such a way that a distance from a surface located nearest to the object side in the first lens group to the electronic image pickup element is reduced to a length between 20 mm and 2 mm.

Preferably, a separation between the first lens group and the second lens group should be variable in such a way as to satisfy the following zoom ratio condition:

$$1.2 < f_T/f_W < 25.0 \quad (6)$$

where $f_w$ is a focal length at which said zoom lens system has the shortest focal length and $f_t$ is a focal length at which said zoom lens system has the longest focal length.

According to yet another aspect of the invention, there is provided a telephone handset comprising a display device with a built-in two-group zoom lens system having phototaking function, a microphone for entering an operator's voice therein, a speaker for producing a voice of a person at the other end and a dial button for entering at least a telephone number therein.

The telephone handset may be constructed in the form of a portable telephone set having an antenna for transmitting and/or receiving radio waves.

Why the aforesaid arrangements are used and how they word will now be described.

In the zoom lens system of two-group construction, one lens for each group or two lenses in all, according to the present invention, the first lens group consists of one concave lens having a strong concave surface directed toward the image plane side and formed of a homogeneous medium and the second lens group consists of one convex lens formed of a homogeneous medium with a stop located between them. For zooming from the wide-angle end to the telephoto end of the lens system, the first lens group is allowed to move largely from the object side to the image side of the lens system while the second lens group is allowed to move from the image side to the object side of the lens system. Thus, the convex lens in the second lens group takes a chief part in the image-forming action of the lens system. This arrangement is favorable in view of aberration correction because the height of a ray passing through the second lens group remains substantially unchanged irrespective of zooming settings. For aberration correction, it is favorable to use an aspherical surface in the second lens group because considerable aberrations are produced at the second lens group.

When the upper limit of 4.0 in condition (1) is exceeded, it is required to increase the separation between the first lens group and the second lens group in a wide-angle setting, resulting in an increase in the entire length of the lens system. When the lower limit of 1.0 in condition (1) is not reached, on the other hand, the power of each lens group becomes too strong to make correction for aberrations with only two lenses.

More preferably, condition (1) should be reduced to:

$$1.5 < f_2/f_W < 2.5 \quad (2)$$

Even more preferably, condition (1) should be reduced to:

$$1.6 < f_2/f_W < 2.1 \quad (3)$$

It is also preferable for the power produced at the front surface in the second lens group to satisfy the following condition:

$$0.5 < (n_2-1)f_2/R_{2F} < 1.5 \quad (4)$$

Here $n_2$ is the refractive index of the convex lens in the second lens group, and $R_{2F}$ is the radius of curvature of a surface of the convex lens located on the object side.

In the zoom lens system of the invention, the stop is located between the first lens group and the second lens group, and moves together with the second lens group during zooming. Thus, the front surface in the second lens group is located nearest to the stop. When the stop is at a position near to a principal point, the amount of distortion produced is small. When the power produced at the front surface in the second lens group is short of the lower limit of 0.5 in condition (4), however, the distortion becomes worse because the power of the final surface in the second lens group is larger than that of the front surface, and power at a position away from the stop becomes strong accordingly. When the upper limit of 1.5 is exceeded, on the other hand, aberrations produced at this surface become too large for correction at other surface.

More preferably for aberration correction, the power of this surface should satisfy:

$$0.9 < (n_2-1)f_2/R_{2F} < 1.1 \quad (5)$$

Preferably in the zoom lens system of the invention, the separation between the first lens group and the second lens group should be variable in such a way as to satisfy the following zoom ratio ($f_T/f_W$) condition:

$$1.2 < f_T/f_W < 25.0 \quad (6)$$

Here $f_w$ is a focal length at which said zoom lens system has the shortest focal length and $f_t$ is a focal length at which said zoom lens system has the longest focal length.

In one preferable embodiment of the invention, this zoom lens system is used with an electronic image pickup element such as a CCD to set up a display device having phototaking function for an electronic camera or the like. According to this embodiment, the zoom lens system can be compactly housed in the display device by allowing the first and second lens groups to move in such a way that the distance from the surface located nearest to the object side in the first lens group to the electronic image pickup element is reduced to the length between 20 mm and 2 mm.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The zoom lens system of the invention will now be explained with reference to two examples.

Figures 1A, 1B, 1C:
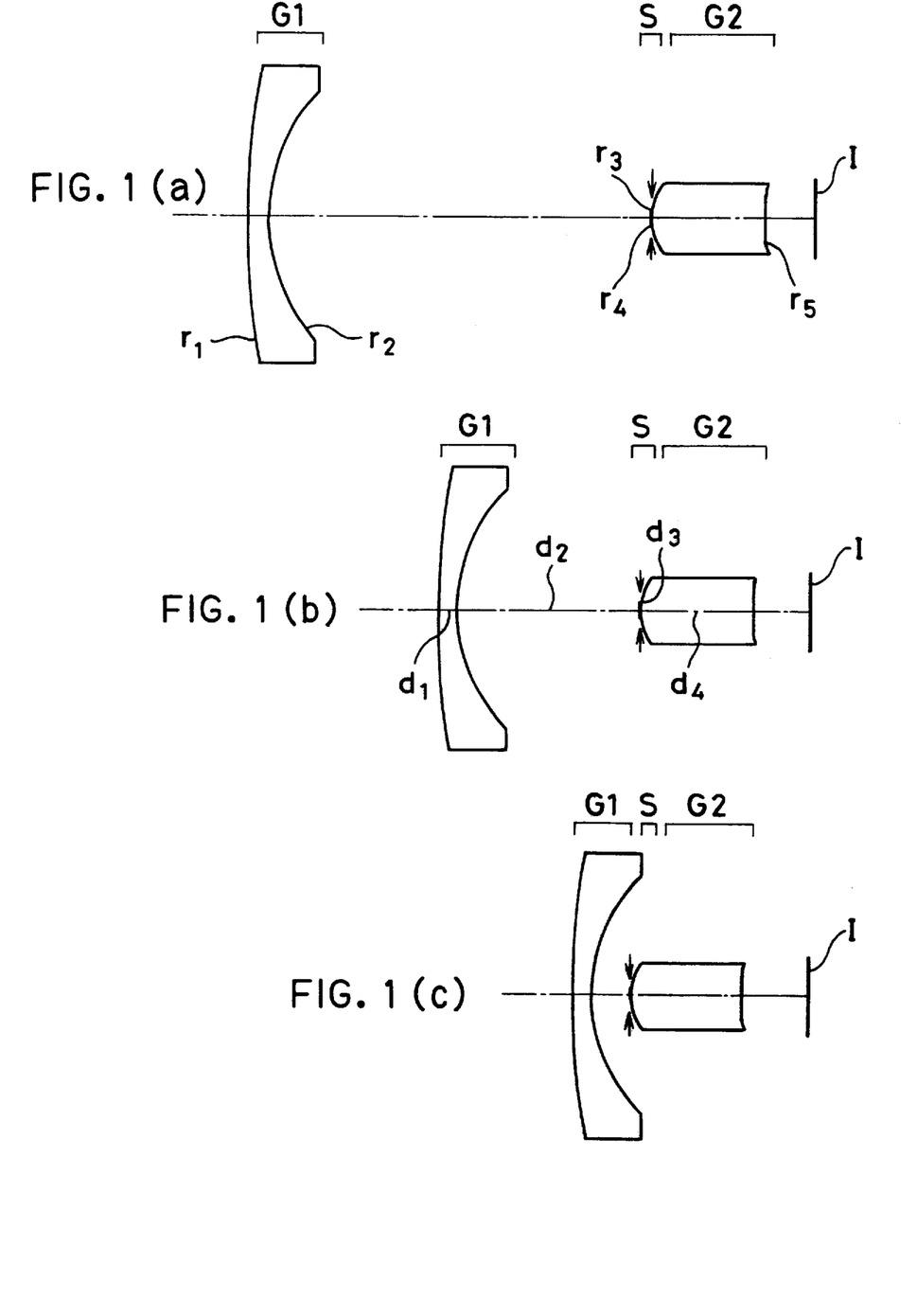
FIGS. 1(a), 1(b) and 1(c) are sectional views of Example 1 of the zoom lens system according to the invention at the wide-angle end, intermediate setting and telephoto end, respectively.
Figure 2:
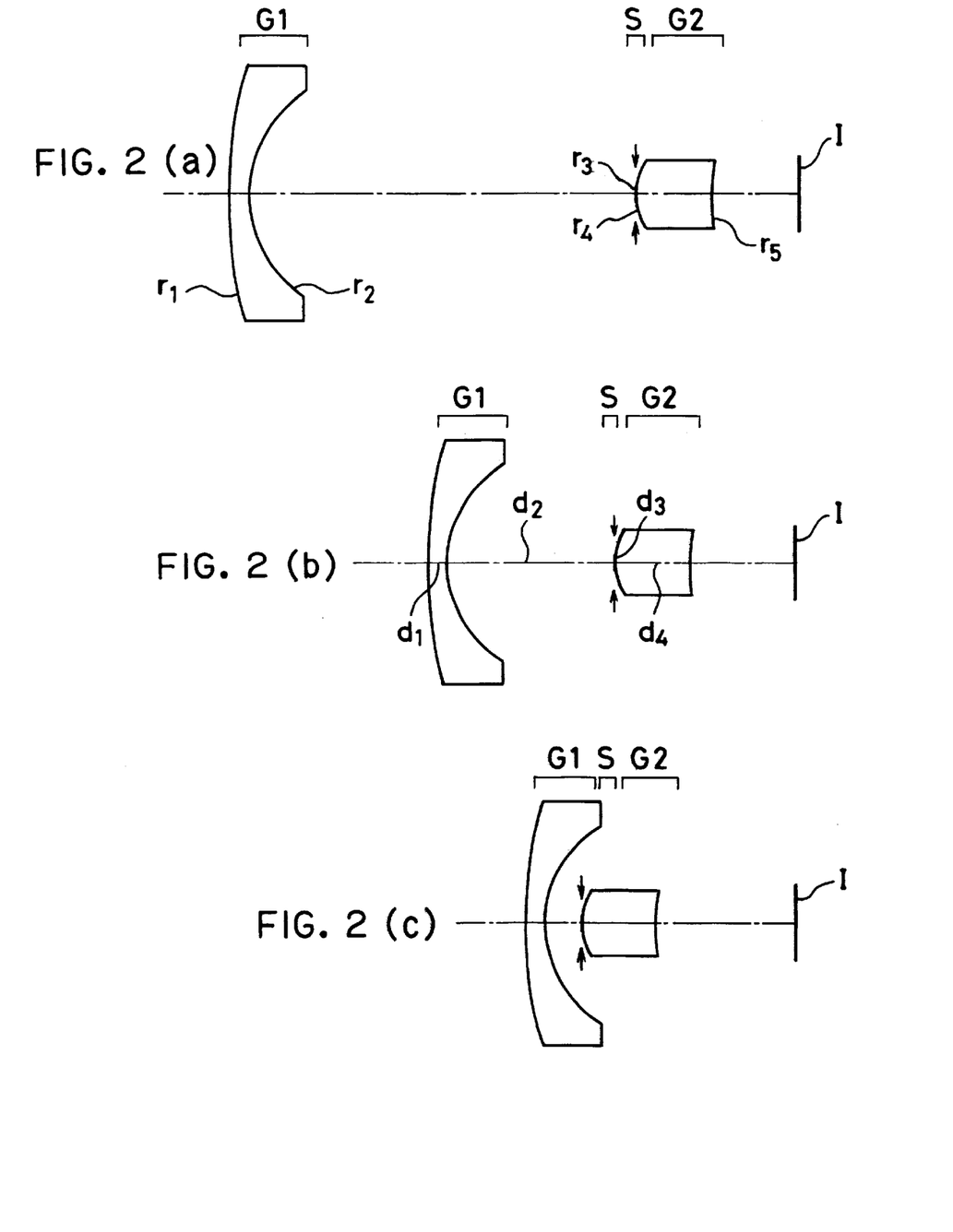
FIGS. 2(a), 2(b) and 2(c) are sectional views of Example 2 of the zoom lens system according to the invention at the wide-angle end, intermediate setting and telephoto end, respectively.

FIGS. 1(a), 1(b) and 1(c) are sectional views of Example 1 of the zoom lens system according to the invention at the wide-angle end, intermediate setting and telephoto end, respectively, and FIGS. 2(a), 2(b) and 2(c) are sectional views of Example 2 of the zoom lens system according to the invention at the wide-angle end, intermediate setting and telephoto end, respectively. Numerical data on each example will be enumerated later.

EXAMPLE 1

This example is directed to a zoom lens system having a focal length of 3.2 to 6.4 mm. In FIGS. 1(a), 1(b) and 1(c), G1, S and G2 stand for a first lens group, a stop and a second lens group, respectively, while I represents an image formation surface. This zoom lens system is a zoom lens system of two-group construction wherein the first lens group G1 consists of one negative meniscus lens having a strong concave surface directed toward the image plane side and the second lens group G2 consists of one double-convex lens. For zooming from the wide-angle end to the telephoto end of the system, the first lens group G1 moves largely from the object side to the image side of the system while the second lens group G2 moves together with the stop S from the image side to the object side. An aspherical surface is used for the image-side surface of the double-convex lens in the second lens group G2.

EXAMPLE 2

This example is directed to a zoom lens system having a focal length of 3.2 to 9.6 mm. In FIGS. 2(a), 2(b) and 2(c), G1, S and G2 stand for a first lens group, a stop and a second lens group, respectively, while I represents an image formation surface. This zoom lens system is a zoom lens system of two-group construction wherein the first lens group G1 consists of one negative meniscus lens having a strong concave surface directed toward the image plane side and the second lens group G2 consists of one positive meniscus lens having a strong convex surface directed toward the object side. For zooming from the wide-angle end to the telephoto end of the system, the first lens group G1 moves largely from the object side to the image side of the system while the second lens group G2 moves together with the stop S from the image side to the object side. Three aspherical surfaces are used, one for the object-side surface of the negative meniscus lens in the first lens group G1 and the remaining two for both surfaces of the double-convex lens in the second lens group G2. Example 2 is better in terms of zoom ratio and brightness than Example 1 because three aspherical surfaces are used.

Set out below are numerical data on Examples 1 and 2. The symbols used hereinafter but not hereinbefore have the following means:

f is a focal length of the overall system, $F_{NO}$ is an F-number,

ω is a half field angle, $f_B$ is a back focus, $r_1, r_2, \ldots$ are radii of curvature of lens surfaces, $d_1, d_2, \ldots$ are separations between adjacent lens surfaces, $n_{d1}, n_{d2}, \ldots$ are d-line indices of refraction of lenses, and $\nu_{d1}, \nu_{d2}, \ldots$ are d-line Abbe's numbers of lenses.

Here let x denote a positive direction of propagation of light and y represent a direction perpendicular to the optical axis. Then, aspherical shape is given by $$x=(y^2/r)/[1+\{1-(K+1)(y/r)^2\}^{1/2}]+A_4 y^4+A_6 y^6$$

where r is a radius of paraxial curvature, K is a conical coefficient, and $A_4$ and $A_6$ are fourth and sixth-order aspherical coefficients, respectively. The values of coefficients not referred to hereinbelow are zero.

EXAMPLE 1

$f=3.2\sim 4.5\sim 6.4$ $F_{NO}=3.578\sim 3.758\sim 4.016$ $\omega=34.2°\sim 24.1°\sim 17.0°$ $f_B=2.6570\sim 2.9912\sim 3.4798$

| | | | |
|---|---|---|---|
| $r_1 = 45.9657$ | $d_1 = 1.0000$ | $n_{d1} = 1.52542$ | $\nu_{d1} = 55.78$ |
| $r_2 = 8.8887$ | $d_2 = $ (Variable) | | |
| $r_3 = \infty$ (Stop) | $d_3 = 0.0000$ | | |
| $r_4 = 2.9812$ | $d_4 = 5.7403$ | $n_{d2} = 1.52542$ | $\nu_{d2} = 55.78$ |
| $r_5 = -23.9296$ (Aspheric) | | | |

Zooming Spaces

| f | 3.2 | 4.5 | 6.4 |
|---|---|---|---|
| $d_2$ | 20.0106 | 9.6059 | 2.0000 |

Aspherical Coefficients 5 th surface $K=0$ $A_4=6.1023\times 10^{-3}$ $A_6=2.5431\times 10^{-3}$

| | |
|---|---|
| $f_2/f_w$ | =1.7017 |

$$(n_2-1)f_2/R_{2F}=0.9597$$

EXAMPLE 2

$f=3.2\sim5.5\sim9.6$ $F_{NO}=2.919\sim3.315\sim3.995$ $\omega=33.3°\sim20.2°\sim11.7°$ $f_B=4.8555\sim5.8612\sim7.6537$

| | | | |
|---|---|---|---|
| $r_1$ = 41.2061(Aspheric) | $d_1$ = 1.0000 | $n_{d1}$ = 1.52542 | $\nu_{d1}$ = 55.78 |
| $r_2$ = 6.4043 | $d_2$ = (Variable) | | |
| $r_3$ = ∞ (Stop) | $d_3$ = 0.0000 | | |
| $r_4$ = 3.0978(Aspheric) | $d_4$ = 4.1168 | $n_{d2}$ = 1.52542 | $\nu_{d2}$ = 55.78 |
| $r_5$ = 22.4068(Aspheric) | | | |

Zooming Spaces

| f | 3.2 | 5.5 | 9.6 |
|---|---|---|---|
| $d_2$ | 21.3509 | 9.2128 | 2.0000 |

Aspherical Coefficients 1 st surface $K=0$ $A_4=1.2606\times10^{-4}$ 4 th surface $K=0$ $A_4=-1.3948\times10^{-3}$ 5 th surface $K=0$ $A_4=9.1819\times10^{-3}$

| | |
|---|---|
| $f_2/f_w$ | =1.9918 |

$$(n_2-1)f_2/R_{2F}=1.0810$$

In Examples 1 and 2, focusing may be carried out by movement of the second lens group G2 alone. Set out below are focusing data when the object distance becomes near.

EXAMPLE 1

| | Object Distance | Group Separation | Back Focus |
|---|---|---|---|
| Wide-Angle End | 100.000 | 19.914 | 2.573 |
| Intermediate | 110.070 | 9.418 | 3.179 |
| Telephoto End | 117.188 | 1.584 | 3.896 |

EXAMPLE 2

| | Object Distance | Group Separation | Back Focus |
|---|---|---|---|
| Wide-Angle End | 170.000 | 21.290 | 4.916 |
| Intermediate | 181.132 | 9.016 | 6.058 |
| Telephoto End | 186.553 | 0.482 | 9.172 |

Figure 3:
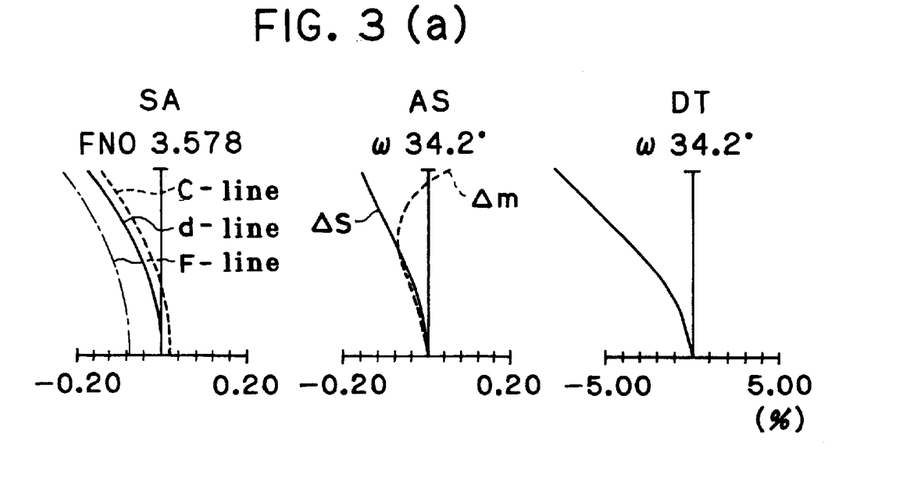
FIGS. 3(a), 3(b) and 3(c) are aberration diagrams of Example 1 upon focused at infinity.
Figure 4:
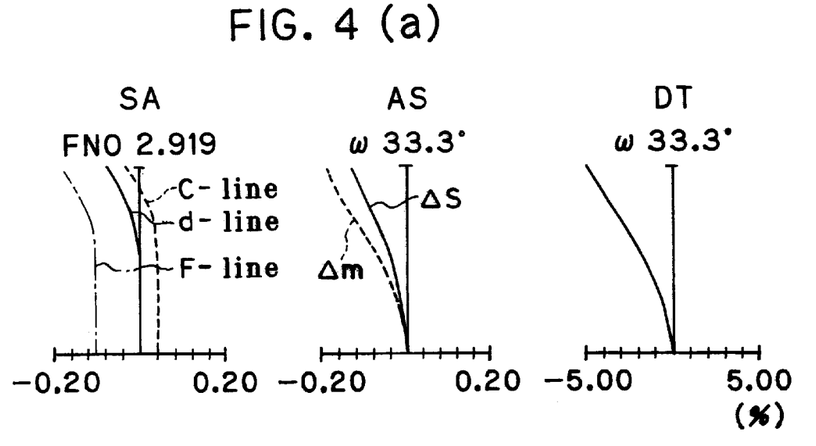
FIGS. 4(a), 4(b) and 4(c) are aberration diagrams of Example 2 upon focused at infinity.

FIGS. 3(a), 3(b) and 3(c) are aberration curves at the wide-angle end, intermediate setting and telephoto end, respectively, of Example 1 upon focused at infinity. FIGS. 4(a), 4(b) and 4(c) are aberration curves at the wide-angle end, intermediate setting and telephoto end, respectively, of Example 2 upon focused at infinity. In FIGS. 3 and 4, SA, AS and DT stand for spherical aberration, astigmatism and distortion, respectively.

The zoom lens system of the invention may be used on various phototaking devices using electronic image pickup elements such as CCDs, MOS sensors, etc., as explained below with reference to some specific examples.

While the first and second lens groups G1 and G2 have been described as being each made up of one single lens, it is to be understood that each lens group may be made up of one cemented lens comprising a plurality of cemented lens elements.

Figure 5:
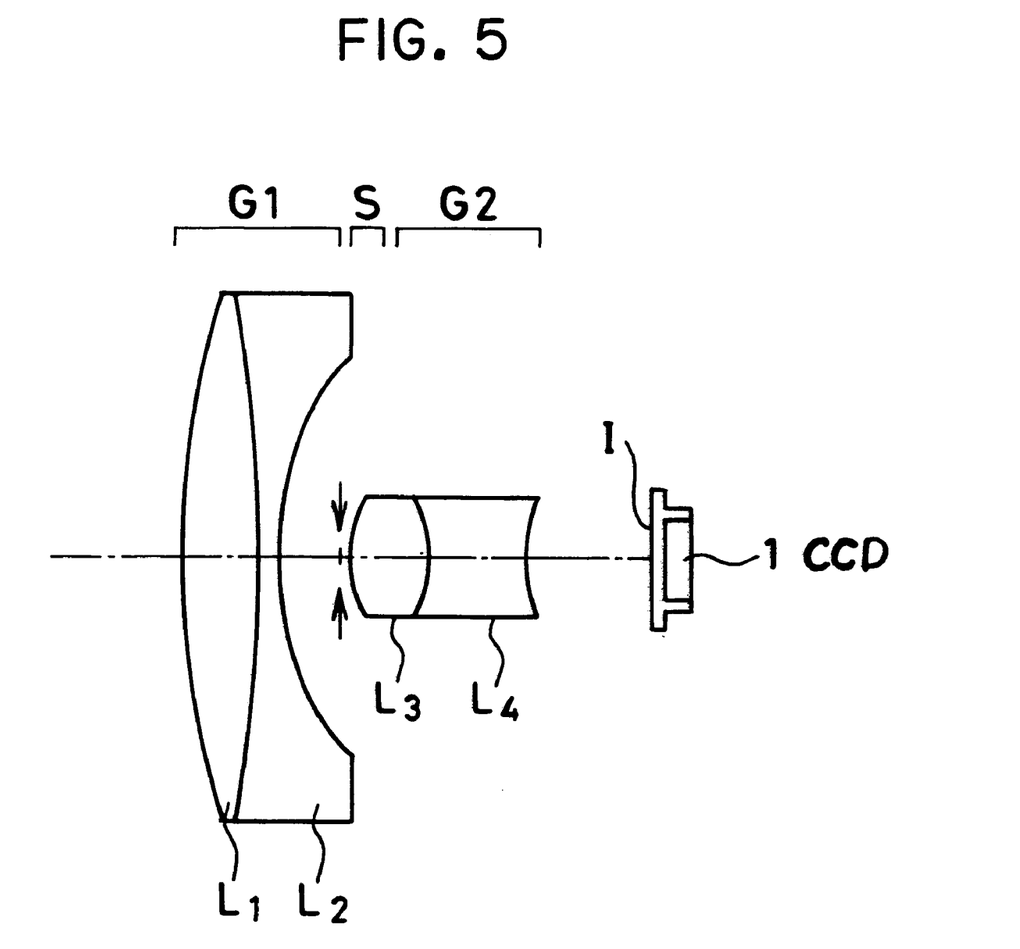
FIG. 5 is a conceptual representation of one modification to Example 1 at its telephoto end.

FIG. 5 is a conceptual representation of one modification to Example 1 at the telephoto end, wherein the first lens group G1 consists of one doublet made up of a positive lens $L_1$ and a negative lens $L_2$ and the second lens group G1 consists of one doublet made up of a positive lens $L_3$ and a negative lens $L_4$. Here the positive lens $L_1$ is constructed in the form of a double-convex lens, the negative lens $L_2$ in the form of a double-concave lens, the positive lens $L_3$ in the form of a double-convex lens and the negative lens $L_4$ in the form of a double-concave lens. It is to be noted that illustrative numerical data are not shown. In FIG. 5, reference numeral 1 stands for a CCD serving as an electronic image pickup element whose image pickup surface is located at an image-forming plane I.

Figure 6:
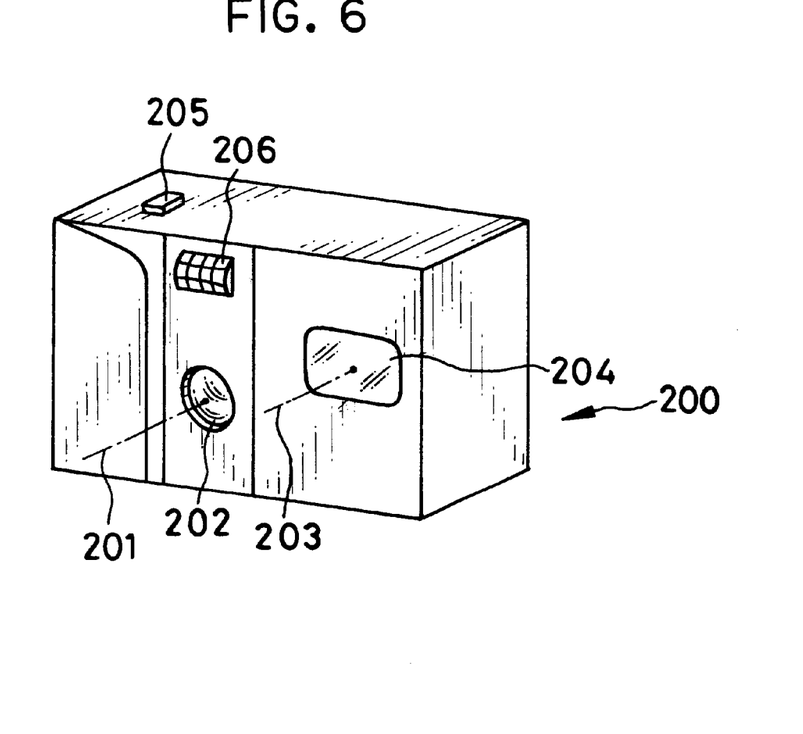
FIG. 6 is a front perspective view showing the appearance of an electronic camera in which the zoom lens system of the invention is incorporated in the form of an objective optical system.
Figure 7:
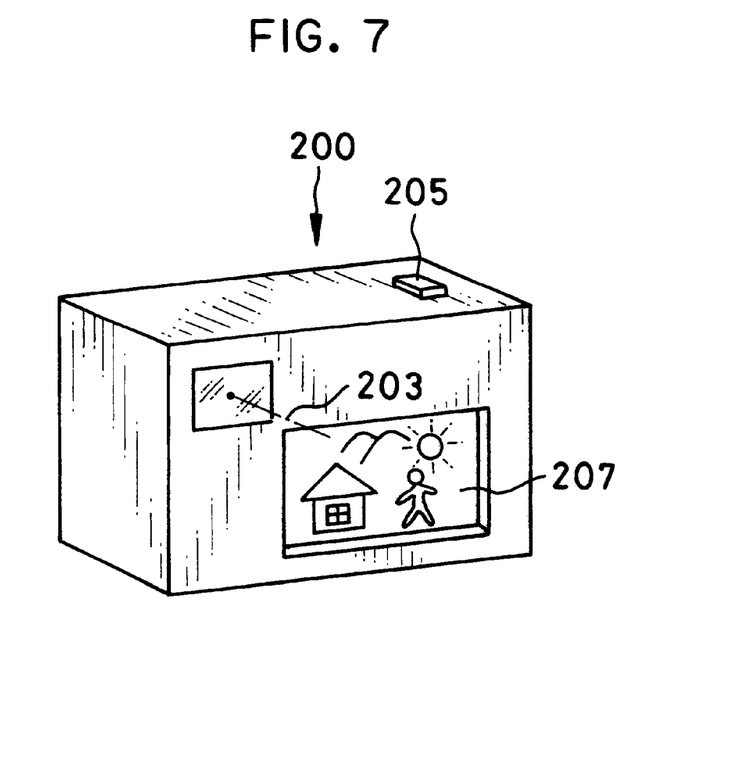
FIG. 7 is a rear perspective view showing the appearance of an electronic camera in which the zoom lens system of the invention is incorporated in the form of an objective optical system.
Figure 8:
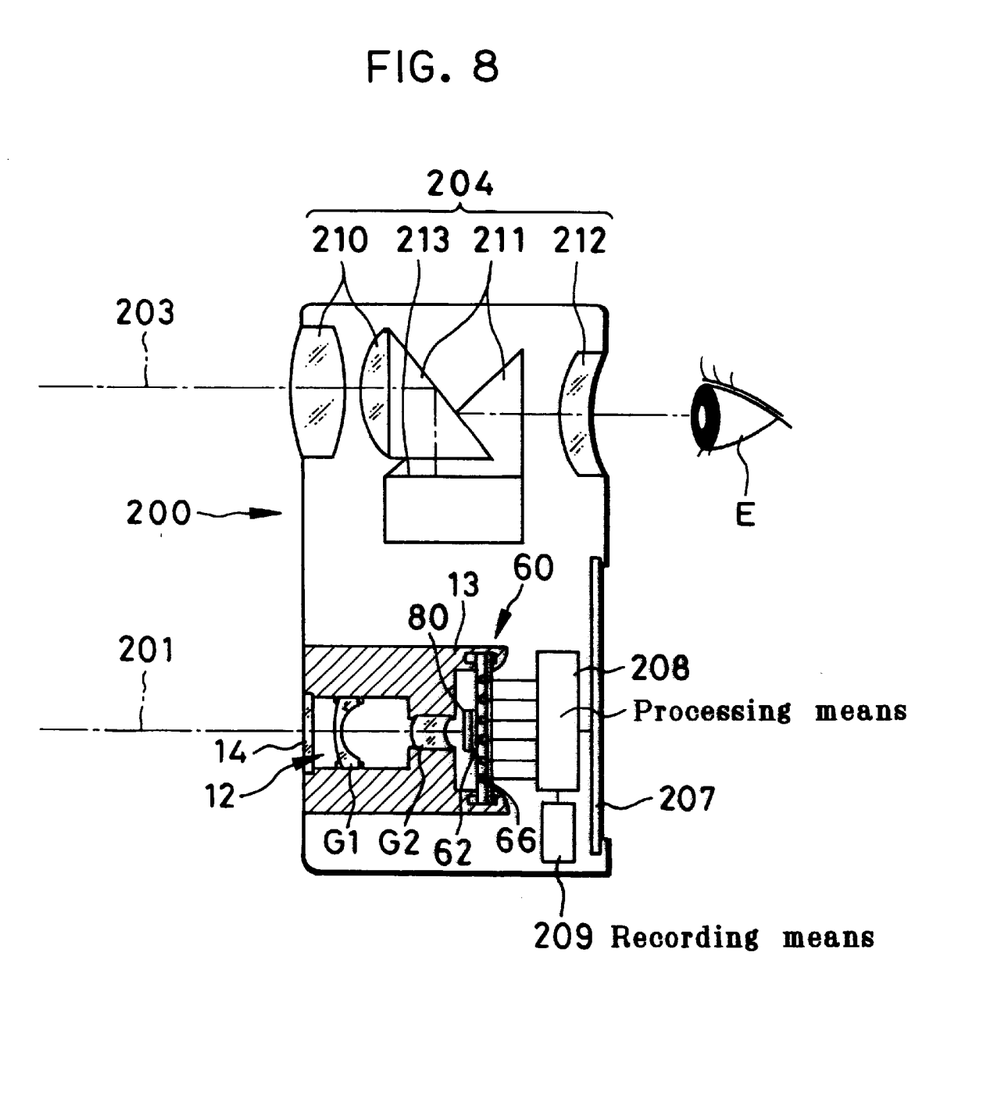
FIG. 8 is a sectional view showing the construction of an electronic camera in which the zoom lens system of the invention is incorporated in the form of an objective optical system.

An electronic camera in which the zoom lens system of the invention is incorporated in the form of an objective optical system is shown in FIGS. 6 to 8. FIGS. 6 and 7 are front and rear perspective views showing the appearance of an electronic camera 200, respectively, and FIG. 8 is a sectional view of the construction of the electronic camera 200. As depicted in FIGS. 6 to 8, the electronic camera 200 comprises a phototaking optical system 202 having a phototaking optical path 201, a finder optical system 204 having a finder optical path 203, a shutter 205, a flash 206 and a liquid crystal display monitor 207 having a flat screen. Upon pressing a shutter 205 mounted on the upper portion of the cameral 200, phototaking occurs through an objective lens system 12 made up of the zoom lens system of the invention (roughly illustrated) that is located as a phototaking objective optical system. An object image formed through the phototaking objective optical system is formed on an image pickup element chip 62 such as a CCD via an IR (infrared) cut filter 80.

It is here to be understood that the IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to achieve some commercial merits, for instance, simple assembly, high camera productivity and cost reductions. At the end of the lens barrel 23, there is provided a cover glass 14 for protection of the objective lens system 12. It is here to be understood that the zoom lens driving mechanism in the lens barrel 13 is not shown.

The object image received at the image pickup element chip 62 is fed to a processing means 208 electrically connected to a terminal 66, through which the object image is displayed as an electronic image on the liquid crystal display monitor 207 mounted on the back side of the camera. This process means 208 also controls a recording means 209 for recording as electronic information the object image phototakan by the image pickup element chip 62. The recording means 209 may be either a memory attached to the processing means 208 or a device that is electrically connected to the processing means 208 to electronically write information in a magnetic recording medium such as a floppy disk or smart medium.

The finder optical system 204 having finder optical path 203 comprises a finder objective optical subsystem 210, a Porro prism 211 for erecting the object image formed by the finder objective optical subsystem 210 and an eyepiece 212 for guiding the object image to an viewer's eyeball E. The Porro prism 211 is divided into a front part and a rear part, between which there is a surface on which the object image is to be formed. On that surface there is located a field frame 213. The Porro prism 211 comprises four reflecting surfaces for erecting the object image formed by the finder objective optical subsystem 210.

To reduce the number of parts thereby achieving compactness and cost reductions, the finder optical system 204 may be removed from the camera 200. In this case, the viewer phototakes the object image while looking at the liquid crystal display monitor 207.

Figure 9:
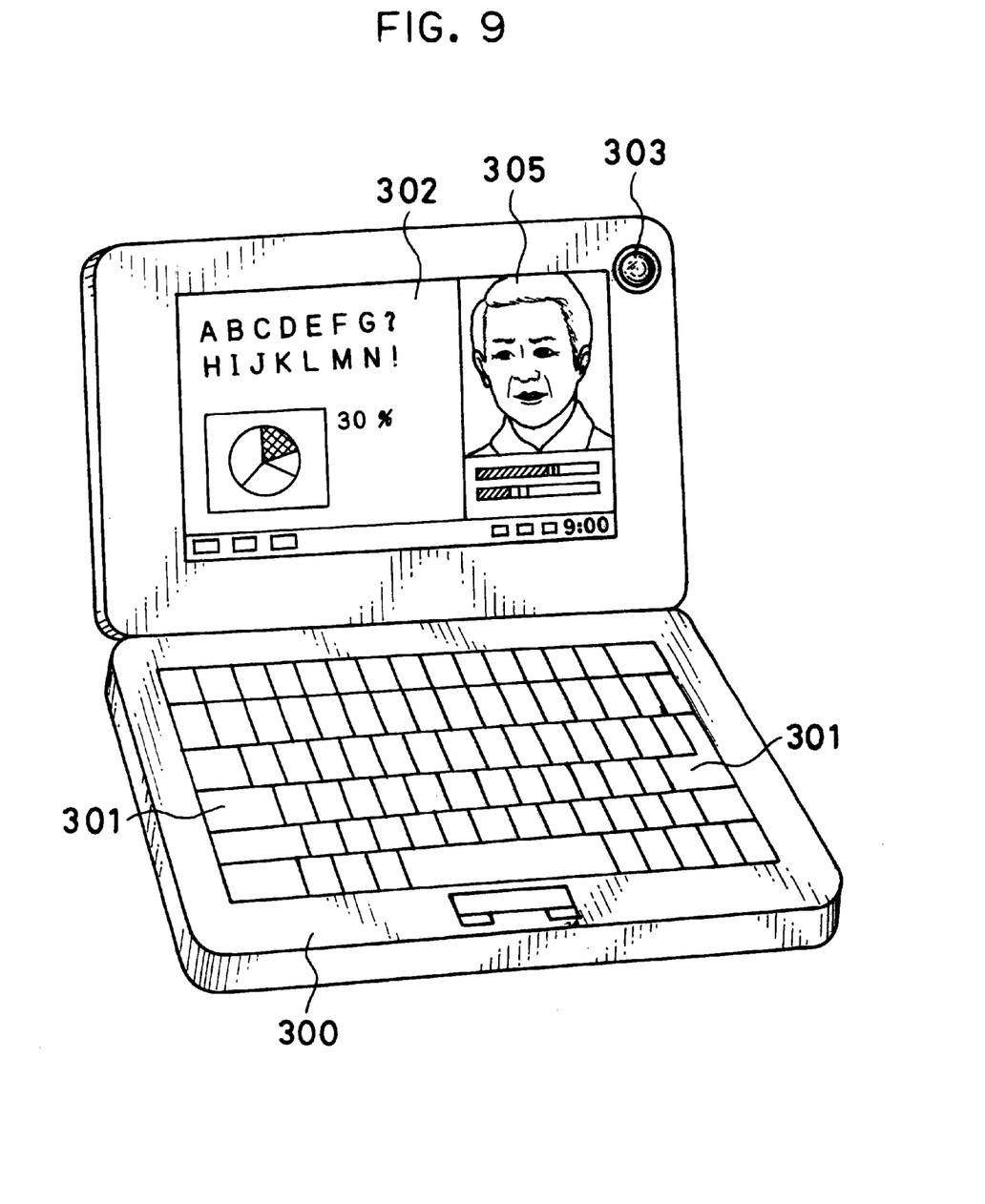
FIG. 9 is a front perspective view illustrative of an uncovered personal computer in which the zoom lens system of the invention is incorporated in the form of an objective optical system.
Figure 10:
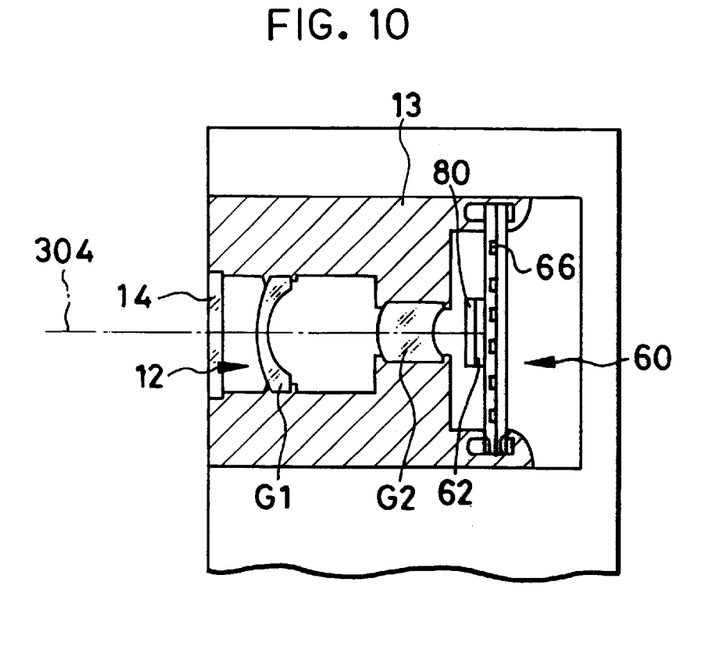
FIG. 10 is a sectional view illustrative of a phototaking optical system in a personal computer.
Figure 11:
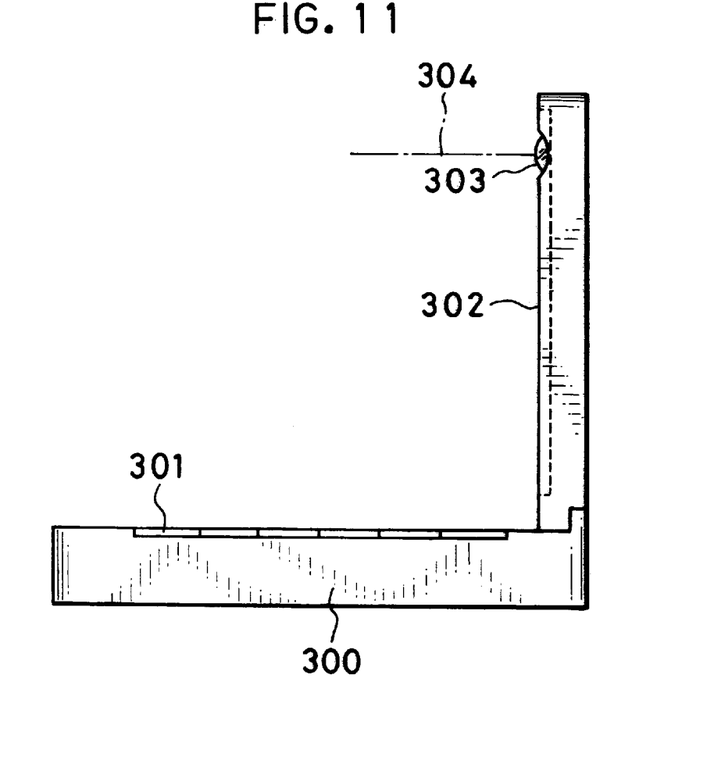
FIG. 11 is a side view of FIG. 9.

Shown in FIGS. 9 to 11 is a personal computer that is one example of the information processor in which the zoom lens system of the invention is incorporated in the form of an objective optical system. FIG. 9 is a front perspective views of an uncovered personal computer 300, FIG. 10 is a sectional view of a phototaking optical system 303 mounted on the personal computer 300, and FIG. 11 is a side view of FIG. 9. As depicted in FIGS. 9 to 11, the personal computer 300 comprises a key board 301 for allowing an operator to enter information therein from outside, information processing and recording means (not shown), a monitor 302 having a flat screen for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in a right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 12 comprising the zoom lens system of the invention (roughly illustrated) and an image pickup element chip 62 for receiving an image. These are built in the personal computer.

It is here to be understood that an IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to make assembly simple. At the end of the lens barrel 23, there is provided a cover glass 14 for protection of the objective lens system 12. It is here to be understood that the zoom lens driving mechanism in the lens barrel 13 is not shown.

An object image received at the image pickup element chip 62 is entered from a terminal 66 in the processing means in the personal computer 300, and displayed as an electronic image on the monitor 302. Shown in FIG. 9 as an example is a phototaken image 305 of the operator. It is possible to display the image 305, etc. on a personal computer at the other end on a remote place via an internet or telephone line.

Figure 12:
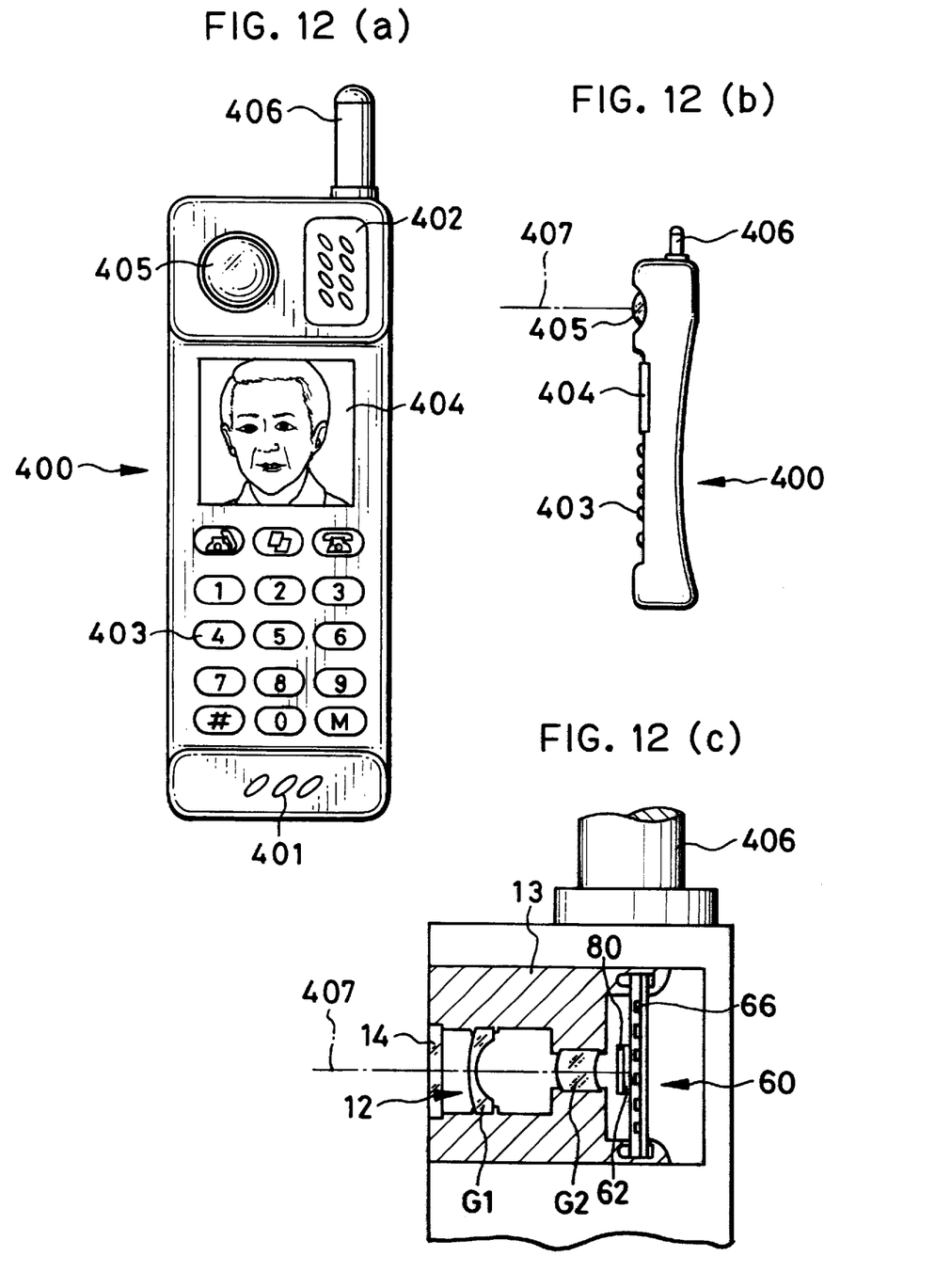
FIGS. 12(a), 12(b) and 12(c) are a front view, a side view and a sectional view of a portable telephone handset, respectively, in which the zoom lens system of the invention is incorporated in the form of an objective optical system.

Illustrated in FIG. 12 is a telephone handset that is one example of the information processor in which the zoom lens system of the invention is built in the form of a phototaking optical system, especially a convenient-to-carry portable telephone handset. FIG. 12(*a*) is a front view of a portable telephone handset 400, FIG. 12(*b*) is a side view of handset 400 and FIG. 12(*c*) is a sectional view of a phototaking optical system 405. As depicted in FIGS. 12(*a*) to 12(*c*), the telephone handset 400 comprises a microphone portion 401 for entering an operators voice therein as information, a speaker portion 402 for producing a voice of a person on the other end, an input dial 403 allowing the operator to enter information therein, a monitor 404 having a flat screen for displaying phototaken images of the operator and the person on the other end and information such as telephone numbers, an antenna 406 for transmitting and receiving communication waves and a processing means (not shown) for processing image information, communication information, input signals, etc. The arrangement of these parts is not necessarily limited to that illustrated. The phototaking optical system 405 includes on a phototaking optical path 407 an objective lens system 12 comprising the zoom lens system (roughly illustrated) of the invention and an image pickup element chip 62 for receiving an object image. These are built in the telephone handset 400.

It is here to be understood that an IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to make assembly simple. At the end of the lens barrel 13, there is provided a cover glass 14 for protection of the objective lens system 12. It is here to be understood that the zoom lens driving mechanism in the lens barrel 13 is not shown.

The object image received at the image pickup element chip 62 is entered from a terminal 66 in a processing means (not shown), and displayed as an electronic image on the monitor 404 and/or a monitor on the other end. To transmit an image to a person on the other end, the processing means includes a signal processing function of converting information about the object image received at the image pickup element chip 62 to transmittable signals.

According to the present invention as explained above, it is possible to provide a zoom lens system of two-group construction, one lens for each group, which is less susceptible to aberration variations even upon zooming and can be much more increased in terms of lens aperture and zoom ratio.

What we claim is:

1. A zoom lens system of two-group construction, which comprises, in order from an object side thereof, a first lens group having negative refracting power and a second lens group having positive refracting power and in which a focal length thereof is varied by moving both said lenses while an optical axis separation therebetween is varied, wherein:
   said first lens group consists of one concave lens having a strong concave surface directed toward an image plane side of said zoom lens system and formed of a homogeneous medium,
   said second lens group consists of one convex lens formed of a homogeneous medium, where said convex lens in said second lens group has at least one surface defined by an aspherical surface,
   a stop is located between said first lens group and said second lens group,
   said stop moves together with said second lens group, and
   said first lens group moves from said object side toward an image side of said zoom lens system while said second lens group moves from said image side toward said object side during zooming from a wide-angle end to a telephoto end of said zoom lens system.

2. A zoom lens system of two-group construction, which satisfies the following ratio relation:

$$1.0 < f_2/f_W < 4.0$$

where $f_W$ is a focal length at which said zoom lens system has the shortest focal length and $f_2$ is a focal length of said second lens group, and which comprises, in order from an object side thereof, a first lens group having negative refracting power and a second lens group having positive refracting power and in which a focal length thereof is varied by moving both said lenses while an optical axis separation therebetween is varied, wherein:
   said first lens group consists of one concave lens having a strong concave surface directed toward an image plane side of said zoom lens system and formed of a homogeneous medium,
   said second lens group consists of one convex lens formed of a homogeneous medium,
   a stop is located between said first lens group and said second lens group,
   said stop moves together with said second lens group, and
   said first lens group moves from said object side toward an image side of said zoom lens system while said second lens group moves from said image side toward said object side during zooming from a wide-angle end to a telephoto end of said zoom lens system.

3. A zoom lens system of two-group construction, which comprises, in order from an object side thereof, a first lens group having negative refracting power and a second lens group having positive refracting power and in which a focal length thereof is varied by moving both said lenses while an optical axis separation therebetween is varied, wherein:
   said first lens group consists of one concave lens having a strong concave surface directed toward an image plane side of said zoom lens system and formed of a homogeneous medium,
   said second lens group consists of one convex lens formed of a homogeneous medium,
   a stop is located between said first lens group and said second lens group,
   said stop moves together with said second lens group while the following relation is satisfied;

$$0.5 < (n_2-1)f_2/R_{2F} < 1.5$$

where $n_2$ is a refractive index of said convex lens in said second lens group, $R_{2F}$ is a radius of curvature of a surface of said convex lens located on said object side, and $f_2$ is a focal length of said second lens group, and
   said first lens group moves from said object side toward an image of said zoom lens system while said second lens group moves from said image side toward said object side during zooming from a wide-angle end to a telephoto end of said zoom lens system.

4. A display device with a built-in two-group zoom lens system having phototaking function, which comprises:
   a first lens group consisting of one negative lens and a second lens group consisting of one positive lens,
   an electronic image pickup element for receiving an object image formed by only refracting powers of said first lens group and said second lens group, and a processing circuit for electrically processing information on said object image received by said electronic image pickup element, and
   an image display element for displaying the information on said object image fed through said processing circuit to an viewer.

5. The display device with a built-in two-group zoom, lens system having phototaking function according to claim 4, wherein a separation between said first lens group and said second lens group is varied for zooming from a wide-angle end to a telephoto end of said zoom lens system.

6. The display device with a built-in two-group zoom lens system having phototaking function according to claim 5, wherein said separation between said first lens group and said second lens group is narrowed for zooming from said wide-angle end to said telephoto end.

7. The display device with a built-in two-group zoom lens system having phototaking function according to claim 5, wherein a stop is located between said first lens group and said second lens group.

8. The display device with a built-in two-group zoom lens system having phototaking function according to claim 5, wherein a filter is located between said second lens group and said electronic image pickup element.

9. The display device with a built-in two-group zoom lens system having phototaking function according to claim 5, wherein a cover member is located in front of said first lens group.

10. The display device with a built-in two-group zoom lens system having phototaking function according to claim 5, wherein said first lens group consists of one cemented lens comprising a plurality of cemented lens elements.

11. The display device with a built-in two-group zoom lens system having phototaking function according to claim 5, wherein said first lens group consists of one lens element.

12. The display device with a built-in two-group zoom lens system having phototaking function according to claim 5, wherein said second lens group consists of one cemented lens comprising a plurality of cemented lens elements.

13. The display device with a built-in two-group zooms lens system having phototaking function according to claim 5, wherein said second lens group consists of one lens element.

14. The display device with a built-in two-group zoom lens system having phototaking function according to claim 5, wherein said image display element is built up of a liquid crystal display having a flat screen.

15. The display device with a built-in two-group zoom lens system having phototaking function according to claim 5, wherein said first lens group has at least one aspherical surface formed in such a way as to make correction for aberrations.

16. The display device with a built-in two-group zoom lens system having phototaking function according to claim 5, wherein said second lens group has at least one aspherical surface formed in such a way as to make correction for aberrations.

17. The display device with a built-in two-group zoom lens system having phototaking function according to claim 5, wherein the following ratio relation is satisfied:

$$1.0 < f_2/f_W < 4.0 \tag{1}$$

where $f_W$ is a focal length at which said zoom lens system has the shortest focal length and $f_2$ is a focal length of said second lens group.

18. The display device with a built-in two-group zoom lens system having phototaking function according to claim 5, wherein a stop moves together with said second lens group while the following relation is satisfied:

$$0.5 < (n_2-1)f_2/R_{2F} < 1.5 \tag{4}$$

where $n_2$ is a refractive index of said convex lens in said second lens group, $R_{2F}$ is a radius of curvature of a surface of said convex lens located on said object side, and $f_2$ is a focal length of said second lens group.

19. The display device with a built-in two-group zoom lens system having phototaking function according to claim 5, wherein said zoom lens system is compactly housed therein by allowing said first lens group and said second lens group to move in such a way that a distance from a surface located nearest to said object side in said first lens group to said electronic image pickup element is reduced to a length between 20 mm and 2 mm.

20. The display device with a built-in two-group zoom lens system having phototaking function according to claim 5, wherein a separation between said first lens group and said second lens group is varied in such a way as to satisfy the following zoom ratio condition:

$$1.2 < f_T/f_W < 25.0 \tag{6}$$

where $f_W$ is a focal length at which said zoom lens system has the shortest focal length and $f_T$ is a focal length at which said zoom lens system has the longest focal length.

21. A telephone handset comprising a display device with a built-in two-group zoom lens system having phototaking function as claimed in any one of claims 5 to 20, a microphone for entering an operator's voice therein, a speaker for producing a voice of a person on the other end and a dial button for entering at least a telephone number therein.

22. The telephone handset according to claim 21, which further includes an antenna for transmitting and/or receiving radio waves.

* * * * *